United States Patent
Gillet

(10) Patent No.: US 12,225,921 B2
(45) Date of Patent: Feb. 18, 2025

(54) METHOD FOR OBTAINING A PRODUCT IN THE FORM OF DEEP-FROZEN, DISSOLVED-GAS-RICH GRANULES, PARTICLES OR BEADS, AND ASSOCIATED EQUIPMENT

(71) Applicant: GENIALIS, Henrichemon (FR)

(72) Inventor: Guillaume Gillet, Salbris (FR)

(73) Assignee: GENIALIS, Henrichemon (FR)

( * ) Notice: Subject to any disclaimer, the term of this patent is extended or adjusted under 35 U.S.C. 154(b) by 1108 days.

(21) Appl. No.: 16/972,364

(22) PCT Filed: Jun. 4, 2019

(86) PCT No.: PCT/FR2019/051307
§ 371 (c)(1),
(2) Date: Apr. 20, 2021

(87) PCT Pub. No.: WO2019/234341
PCT Pub. Date: Dec. 12, 2019

(65) Prior Publication Data
US 2021/0235731 A1    Aug. 5, 2021

(30) Foreign Application Priority Data

Jun. 4, 2018   (FR) ..................... 1854814

(51) Int. Cl.
*A23L 3/375*     (2006.01)
*A23F 5/24*      (2006.01)
(Continued)

(52) U.S. Cl.
CPC .............. *A23L 3/375* (2013.01); *A23L 2/54* (2013.01); *B01J 2/06* (2013.01); *A23F 5/243* (2013.01); *A23L 3/361* (2013.01); *F25D 2400/30* (2013.01)

(58) Field of Classification Search
CPC .. A23L 2/54; A23L 3/361; A23L 3/375; A23F 5/243; B01J 2/06; F25D 2400/30
See application file for complete search history.

(56) References Cited

U.S. PATENT DOCUMENTS

| | | | |
|---|---|---|---|
| 5,126,156 A * | 6/1992 | Jones | A23G 9/04 426/418 |
| 5,162,156 A | 11/1992 | Troughton et al. | |

(Continued)

FOREIGN PATENT DOCUMENTS

| | | |
|---|---|---|
| EP | 1152183 A1 | 11/2001 |
| ES | 2194558 B1 | 11/2003 |
| WO | 2008/043909 A3 | 4/2008 |

OTHER PUBLICATIONS

International Search Report for International Application No. PCT/FR2019/051307 dated Sep. 4, 2019, 3 pages.

(Continued)

*Primary Examiner* — Henry T Crenshaw
(74) *Attorney, Agent, or Firm* — TraskBritt

(57) ABSTRACT

A method and associated equipment for obtaining a product in the form of deep-frozen, dissolved-gas-rich granules, particles or beads from a liquid, semi-liquid or pasty matrix, comprises the following steps: gasification of the matrix by incorporating a gas; dispensing the matrix in the form of drops; and cryogenically freezing the matrix drops by immersion in a cryogenic fluid. The step of gasification of the matrix involves dissolving a large amount of the gas generated by the evaporation of the cryogenic fluid in the drops by increasing the number of gas molecules in a high gas density zone, called high molecular density zone, located above the surface of the cryogenic fluid and on the path of the matrix drops before they are immersed in the fluid.

4 Claims, 2 Drawing Sheets

(51) Int. Cl.
*A23L 2/54* (2006.01)
*A23L 3/36* (2006.01)
*B01J 2/06* (2006.01)

(56) References Cited

U.S. PATENT DOCUMENTS

| | | |
|---|---|---|
| 6,223,542 B1 | 5/2001 | Jones et al. |
| 2017/0049126 A1 | 2/2017 | Braithwaite |

OTHER PUBLICATIONS

International Written Opinion for International Application No. PCT/FR2019/051307 dated Sep. 4, 2019, 6 pages.

\* cited by examiner

METHOD FOR OBTAINING A PRODUCT IN THE FORM OF DEEP-FROZEN, DISSOLVED-GAS-RICH GRANULES, PARTICLES OR BEADS, AND ASSOCIATED EQUIPMENT

CROSS-REFERENCE TO RELATED APPLICATIONS

This application is a national phase entry under 35 U.S.C. § 371 of International Patent Application PCT/FR2019/051307, filed Jun. 4, 2019, designating the United States of America and published as International Patent Publication WO 2019/234341 A1 on Dec. 12, 2019, which claims the benefit under Article 8 of the Patent Cooperation Treaty to French Patent Application Serial No. 1854814, filed Jun. 4, 2018.

TECHNICAL FIELD

The present disclosure relates to the field of pressurized cryogenics of fluid products.

BACKGROUND

The present disclosure relates more particularly to a method and associated equipment for obtaining a product in the form of deep-frozen, dissolved-gas-rich granules, particles or beads, from a liquid, semi-liquid or pasty matrix, comprising the steps of gasifying the matrix by incorporating a gas, dispensing the matrix in the form of drops and cryogenizing the matrix drops by immersion in a cryogenic fluid.

The present disclosure is intended, in particular, but not exclusively, for obtaining a product in the form of granules, particles or beads from a food matrix (food or drink) or cosmetic (lotion, milk or fluid cream, for example) in a fluid state (i.e., liquid, semi-liquid or pasty).

Among the solutions proposed for the production of beads or granules of cryogenized products, International Patent Application Publication No. WO2008/043909 teaches a known method implementing two successive steps consisting in dissolving gas in a more or less viscous liquid matrix by bringing the matrix into contact with an atmosphere whose partial gas pressure is greater than 2 bars, then cryogenizing, under the same pressure conditions as during the first step, the matrix containing the dissolved gas in the form of drops in a cryogenic fluid in the liquid state.

The advantage of this method lies mainly in the properties provided to the final product, both during storage and during re-use. Among the properties provided are, for example, the development of protection against oxidation during storage, on the one hand, and the formation of foam during reheating, on the other hand. However, the method is very difficult to implement because it requires very specific equipment, capable of withstanding both extreme temperature and pressure conditions while keeping people safe.

Other solutions were proposed in the past or even today for the production of beads or granules of cryogenized products. U.S. Patent Application Publication No. US2017/049126 illustrates the general principles of these methods in which the beads or granules are formed by flow from a shower, then drop into a cryogenic fluid before being extracted therefrom through a sieve or a filter. The cryogenic fluid may be set in motion by gravitational flow or using a pump, for example.

However, the methods of this type have drawbacks. In particular, they are always open to their environment so as to allow the continuous recovery of the products resulting from the treatment. Therefore, gas extraction is necessary in order to ensure that people working in the environment of the machines are protected against the risk of anoxia. Moreover, they do not make it possible to obtain products having the properties observed with the method described in the aforementioned International Patent Application Publication No. WO2008/043909 (anti-oxidation and foam formation).

The present disclosure aims to remedy these problems by providing a method and associated equipment for obtaining a product in the form of deep-frozen granules, particles or beads containing dissolved gas in large quantities, which are simple to implement and are safe for people.

The method according to the present disclosure and the equipment used are also aimed at preserving the integrity of the starting matrix, in particular, its physicochemical and organoleptic properties when it is a food matrix.

BRIEF SUMMARY

To this end, and according to a first aspect, the present disclosure provides a method for obtaining a product in the form of deep-frozen, dissolved-gas-rich granules, particles or beads, from a liquid, semi-liquid or pasty matrix, comprising the steps of gasifying the matrix by incorporating a gas, dispensing the matrix in the form of drops and cryogenizing the matrix drops by immersion in a cryogenic fluid, the method being characterized in that the matrix gasification step involves dissolving, in large quantity, the gas generated by the evaporation of the cryogenic fluid in the matrix drops by increasing the number of gas molecules in a zone of high gas density, called a high gas molecular density zone, located above the surface of the cryogenic fluid and on the path of the matrix drops before their immersion into the fluid, the high gas molecular density zone being created by carrying out the gasification and cryogenization of the gasified drops within a closed chamber fitted out to allow evacuation of the gas generated by the evaporation of the cryogenic fluid by natural convection.

"Dissolved in large quantity" means that the product is at least saturated with the gas, even preferably that it is supersaturated with the gas, i.e., that the dissolved quantity corresponds to that obtained by balancing with a partial pressure of the gas greater than atmospheric pressure. The concentration of dissolved gas is then at least equal to the saturation concentration of the gas, given by its solubility, and it is preferably greater than this saturation concentration in the matrix.

Later in the text, for convenience, "gas molecular density" will be discussed instead of using the expression "number of gas molecules."

Thus, owing to the application of a molecular density gradient directly on the matrix drops, the method according to the present disclosure makes it possible to prepare cryogenized products containing dissolved gas in a single step and without the need for complex equipment. It also allows gas to be significantly dissolved in a fluid matrix, by supersaturation, without there being an increase in the pressure measured inside the associated equipment. It makes it possible to preserve the integrity of the starting matrix and its properties, in particular, in terms of its physicochemical and organoleptic properties when it is a food matrix.

Advantageously, the gasification step is carried out at a pressure greater than or equal to atmospheric pressure, preferably equal to atmospheric pressure.

Advantageously, the step of cryogenizing the gasified drops to form supersaturated granules, particles or beads is carried out by immersion in a cryogenic fluid bath in the same chamber as that in which the gasification is carried out.

Advantageously, the method comprises a step of continuous or semi-continuous collection of the supersaturated granules, particles or beads. Extraction may also be done batch-wise, only extracting frozen products after dripping is complete.

The method according to the present disclosure may be applied to liquid products, such as food drinks, cosmetic milks or even suspensions of living materials (bacteria, yeasts, viruses, stem cells, etc.), to fluid products, such as fluid creams for the face, dessert creams, fruit purees, as well as pasty products, such as cake machines or fresh seaweed preparations.

The properties provided to the products are numerous and may differ depending on their nature. For example, the inerting induced by the dissolution of an inert gas, such as nitrogen, for example, allows an increased resistance to the oxidation of the products, whose conservation is then prolonged. This aspect is particularly advantageous for the preservation of certain highly oxidizable active principles. Another example relates to the formation of foam during the defrosting of the beads, a phenomenon, which is particularly interesting for drinks such as coffee or chocolate, for example. The shape and size of the beads, together with the presence of dissolved gas, also makes it easier to use the products with other technologies. For example, freeze-drying of cryogenized and gas-containing products is faster than freeze-drying starting from the raw product. The products are also better preserved in terms of their integrity and their properties.

The present disclosure also relates to equipment for obtaining a product in the form of deep-frozen, dissolved-gas-rich granules, particles or beads, from a liquid, semi-liquid or pasty matrix, comprising means for dispensing the matrix in the form of drops and a cryonics receptacle containing a cryogenic fluid in which the matrix drops are received to be cryogenized and transformed into supersaturated granules, particles or beads, wherein the equipment comprises a high gas molecular density zone located between the means for dispensing the matrix in the form of drops and the cryonics receptacle, the high gas molecular density zone and the cryonics receptacle being located inside a closed chamber provided with at least one exhaust vent capable of evacuating the gas generated by the evaporation of the cryogenic fluid by natural convection.

The vent is sized to be consistent with the quantity of gas that can be generated in the chamber and, therefore, with the flow rate of the matrix that is to be treated, so that the gas flow to be extracted can flow through the vent without the chamber rising in pressure.

Advantageously, the gas exhaust vent is arranged to maintain the inside of the chamber at a pressure greater than or equal to atmospheric pressure. For certain particular applications requiring a very large quantity of gas dissolved in the matrix, provision may be made to size the vent so that the pressure in the chamber is greater than atmospheric pressure, so that the molecular density is thus even higher in the high molecular density zone.

Advantageously, the cryonics receptacle is located under the means for dispensing the matrix in the form of drops so as to receive the matrix drops by gravitational flow from the means for dispensing the matrix in the form of drops into the cryonics receptacle.

Advantageously, the means for dispensing the matrix in the form of drops are located inside the chamber.

Advantageously, the equipment comprises a device for collecting the granules, particles or beads at the outlet of the cryonics receptacle.

BRIEF DESCRIPTION OF THE DRAWINGS

Other objects and advantages of the present disclosure will become apparent from the following description, made with reference to the accompanying drawings, in which.

DETAILED DESCRIPTION

Figure 1:
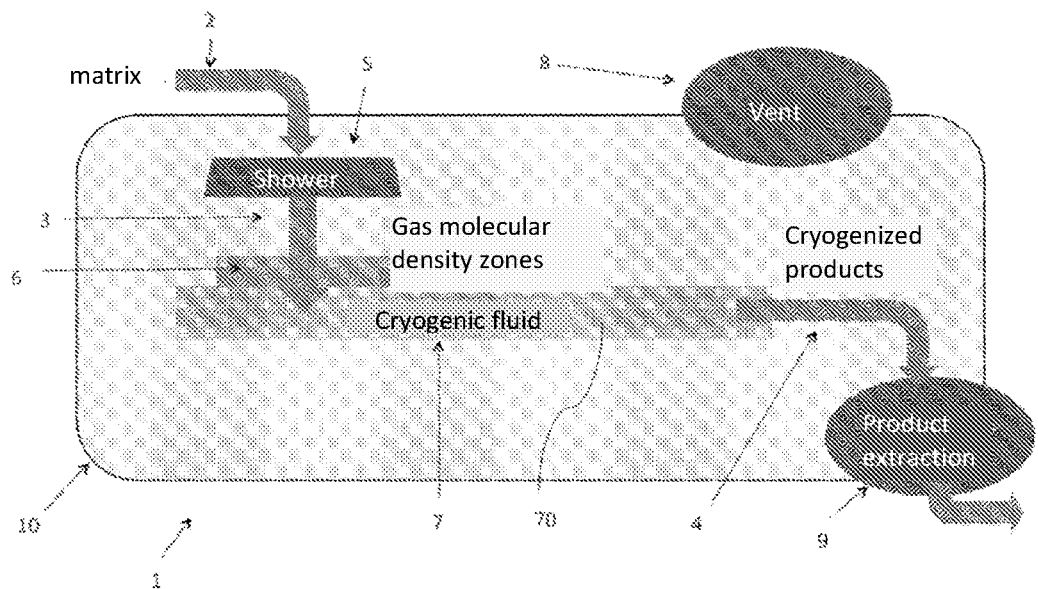
FIG. 1 is a schematic view of equipment according to the present disclosure for obtaining a product in the form of deep-frozen, dissolved-gas-rich granules, particles or beads, from a liquid, semi-liquid or pasty matrix.
Figure 2:
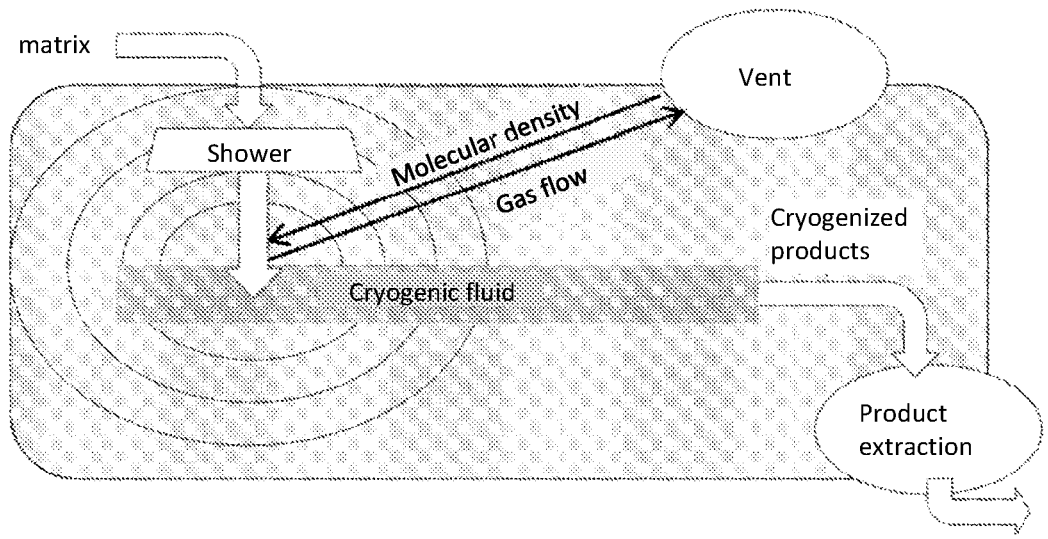
FIG. 2 is a schematic representation of the operating principle of the equipment of FIG. 1.

FIGS. 1 and 2, respectively, show a schematic view of equipment 1 and its operating principle for obtaining a product in the form of deep-frozen, dissolved-gas-rich granules, particles or beads, from a liquid, semi-liquid or pasty matrix.

The equipment 1 comprises means 5 for dispensing the matrix in the form of drops 3, a cryonics receptacle 7 containing a cryogenic fluid 70 and in which the matrix drops 3 are received to be cryogenized and transformed into granules, particles or beads containing the dissolved gas.

The cryonics receptacle 7 is arranged under the means 5 for dispensing the matrix in the form of drops so that the matrix drops 3 at the outlet of the means 5 fall under gravity into the cryonics receptacle 7.

The equipment 1 further comprises a high gas molecular density zone 6 located between the means 5 for dispensing the matrix in the form of drops and the cryonics receptacle 7.

The means 5 for dispensing the matrix in the form of drops, the high gas molecular density zone 6 and the cryonics receptacle 7 are arranged inside a closed chamber 10 provided with an exhaust vent 8 to evacuate the gas generated by the evaporation of the cryogenic fluid 70. It is of course possible to provide several gas exhaust vents without departing from the scope of the present disclosure. In the example described, the vent 8 is arranged to maintain the inside of the chamber 10 at a pressure equal to atmospheric pressure. The vent 8 is arranged to allow evacuation of the gas by natural convection. However, for special needs, means may be provided for closing the vent in order to pressurize the chamber 10.

The equipment 1 further comprises an extraction device 9 for extracting the cryogenized granules, particles or beads. The extraction device 9 is configured to maintain the sealing of the chamber 10, preventing the gas contained in the chamber 10 from escaping. The extraction device 9 may be, for example, an airlock or bucket wheel system, the airlock or the buckets preventing the escape of gas other than that present with the beads or granules in the airlock or buckets.

The extraction device 9 is connected to a collection device (not shown) located outside the chamber 10.

FIG. 2 shows a diagram of the operating principle of the equipment according to the present disclosure. The matrix 2 to be treated flows through a shower 5, so as to form drops 3, which fall into the cryogenic fluid 70. During their fall, the drops 3 pass through the increasingly high gas molecular density zone 6, generated by the boiling cryogenic fluid 70. This increasing density allows a strong dissolution of the gas in the matrix 2. In particular, the maximum dissolution is reached as close as possible to the bath of cryogenic fluid 70, where the molecular density is greatest. The high gas density zone is created as soon as a permanent regime settles within the chamber 10, which is reached due to the diffusion of the gas by natural convection toward the outside of the chamber, only through the vent 8. The molecular density gradient applied to the product drops, influencing the quantity of gas incorporated therein, is linked to the sizing of the chamber itself, but also to the pressure that develops therein.

After an immersion time in the cryogenic fluid 70 sufficient for the drops 3 to become fully solid beads, the latter are extracted from the chamber 10 by a dedicated system of the airlock type consisting, for example, of two valves, which are not open at the same time, or a bucket wheel, making it possible to prevent the gas from escaping continuously in the room where the machine is located.

The granules, beads or particles are then placed in a package, then stored at a temperature sufficient to ensure that the product remains solid, depending on its melting temperature. The storage temperature may thus vary from −18 to −80 degrees Celsius, depending on the initial composition of the matrix. For example, most food matrices can be stored at −18° C.

Comparative Tests

Tests carried out under different conditions of implementation are presented below, Test 2 corresponding to the method according to the present disclosure.

Figure 3:
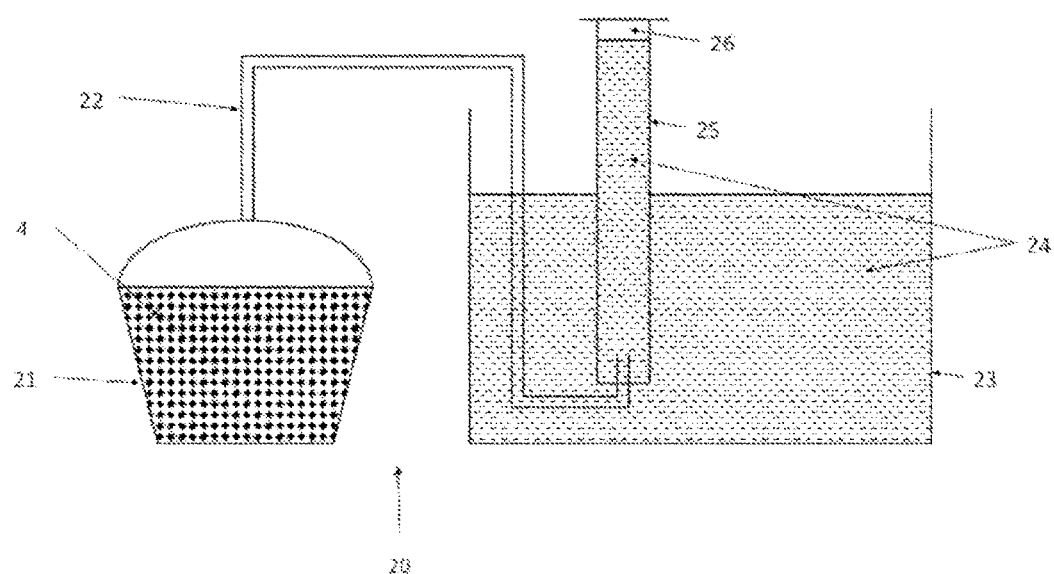
FIG. 3 is a schematic view of the measuring device used to measure the quantity of gas present in the matrix beads obtained according to various tests.

Test 1: Water beads cryogenized under pressure are produced according to the method described in International Patent Application Publication No. WO2008/043909, under a 4 bar pressure, in equipment 1 as described above, but whose vent 8 has been closed. The chamber 10 is thus completely closed. The gas incorporation operation is carried out in the matrix 2, before passing through the shower, by bringing the matrix 2 into contact with an atmosphere whose partial gas pressure is also equal to 4 bars. The beads are stored for 48 hours in a home freezer, at a temperature of −18° C. The amount of gas present in the beads is then measured using a device 20 illustrated in FIG. 3 and described below. To this end, 200 g of beads are placed in a first sealed container 21. An advantageously flexible pipe 22 is connected to the container and is immersed in a second container 23 containing water 24, so that bubbles escaping from the pipe go up into a measuring cylinder 25, also filled with water and placed upside down. When the beads have thoroughly melted in the first container, the volume of gas initially contained in the beads corresponds to the volume of gas 26 that appeared in the measuring cylinder.

Test 2: Cryogenized water beads are produced in the same equipment 1 as above, but without pressure, and with only the vent 8 open. With the exception of the vent 8, chamber 10 is fully enclosed. During the treatment, the pressure observed in chamber 10 is indeed 0 bar. The beads are stored for 48 hours in a home freezer, at a temperature of −18° C. The amount of gas present in the beads is then measured using the device 20 of FIG. 3.

Test 3: Cryogenized water beads are made in the same equipment 1 as above, but without pressure and with air suction through the open vent 8. With the exception of vent 8, chamber 10 is fully enclosed. The beads are stored for 48 hours in a home freezer, at a temperature of −18° C. The amount of gas present in the beads is then measured using the device 20 of FIG. 3.

Test 4: Water beads are produced outside the device, in the form of drops using a syringe above a dewar filled with liquid nitrogen. The beads are stored for 48 hours in a home freezer, at a temperature of −18° C. The amount of gas present in the beads is then measured using the device 20 illustrated in FIG. 3.

Test 5: Water ice cubes are made by conventional freezing, by filling the hemispherical cells of a mold before placing the latter in the freezer at −18° C. After 48 hours, the beads are unmolded and the amount of gas present therein is measured using the device 20 illustrated in FIG. 3.

The results obtained are given in Table 1 below:

| Test number | Volume of gas measured (ml) | Equivalent pressure (bars) |
|---|---|---|
| 1 | 16 | 3.5 |
| 2 | 6 | 1.5 |
| 3 | 0 | 0 |
| 4 | 0 | 0 |
| 5 | 0 | 0 |

It is observed that no gas is present in the products when they are prepared outside any specific equipment or in equipment having a suction of the gas generated. Indeed, Tests 3, 4 and 5 do indeed make it possible to obtain beads, but they contain absolutely no dissolved gas.

It is also observed that the method according to International Patent Application Publication No. WO2008/043909 (incorporation of gas under a pressure of between 2 and 10 bars) makes it possible to obtain products containing dissolved gas in large quantities. Indeed, Test 1 does indeed allow a large quantity of gas to be measured, necessarily obtained by supersaturation of the product.

Finally, it is observed that the method as described herein, corresponding to Test 2, also allows gas to be dissolved in the products, so that a supersaturation is also observed. In this example, the quantity of gas observed in Test 2 is appreciably less than that obtained in Test 1. This is explained by the small dimensions of the treatment device used, which only makes it possible to generate a low gradient gas molecular density and a limited dissolution of the latter in water. It can therefore be seen that by carrying out the step of incorporating gas in the drops 3 of the matrix and not on the matrix 2, and by simply applying a molecular density gradient, a supersaturation of the drops 3 is observed. The equivalent pressure calculated in Table 1 corresponds to the pressure to which the product should have been subjected to obtain the measured gas dissolution. A pressure of 3.5 bars is indeed calculated for the product, which was subjected to a 4 bar pressure (the dissolution was not complete but it is all the same significant, of the order of 88%). An equivalent pressure of 1.5 bars is also calculated for the product, which was not subjected to any pressure, which confirms the existence of a supersaturation under the effect of the high gas molecular density generated above the nitrogen bath.

The present disclosure is described in the foregoing by way of example. It is understood that a person skilled in the art is able to achieve different embodiments of the present disclosure without departing from the scope of the invention as defined by the claims.

The invention claimed is:

1. A system for obtaining a product in a form of deep-frozen, dissolved-gas-rich granules, particles or beads from a liquid, semi-liquid or pasty matrix, the system comprising:
a dispensing device configured to dispense the matrix in a form of matrix drops; and
a cryonics receptacle containing a cryogenic fluid in which the matrix drops are received from the dispensing device to be cryogenized and transformed into supersaturated granules, particles or beads;
a closed chamber having at least one exhaust vent for evacuating gas generated by evaporation of the cryogenic fluid by natural convection, the vent being sized to maintain an interior of the closed chamber at a pressure greater than or equal to atmospheric pressure;
an extraction device for extracting the cryogenized granules, particles or beads, the extraction device being configured to maintain the sealing of the chamber, preventing the gas contained in the chamber from escaping; and
a high gas molecular density zone located between the dispensing device and the cryonics receptacle, the high gas molecular density zone and the cryonics receptacle being located inside the closed chamber.

2. The system of claim 1, wherein the cryonics receptacle is located under the dispensing device so as to receive the matrix drops by gravitational flow from the dispensing device into the cryonics receptacle.

3. The system of claim 2, wherein the dispensing device is located inside the closed chamber.

4. The system of claim 1, wherein the dispensing device is located inside the closed chamber.

* * * * *